(12) United States Patent
Tomasovics et al.

(10) Patent No.: US 8,829,816 B2
(45) Date of Patent: Sep. 9, 2014

(54) LINEAR WALK ARRANGEMENT

(75) Inventors: Attila Tomasovics, Sun Rosier (SG);
Arno Rabenstein, Chancery Grove (SG)

(73) Assignee: Infineon Technologies AG, Neubiberg (DE)

( * ) Notice: Subject to any disclaimer, the term of this patent is extended or adjusted under 35 U.S.C. 154(b) by 204 days.

(21) Appl. No.: 13/571,577

(22) Filed: Aug. 10, 2012

(65) Prior Publication Data

US 2014/0042932 A1    Feb. 13, 2014

(51) Int. Cl.
*H05B 37/02* (2006.01)

(52) U.S. Cl.
USPC .......................................... 315/307; 315/291

(58) Field of Classification Search
None
See application file for complete search history.

(56) References Cited

U.S. PATENT DOCUMENTS

| | | | | |
|---|---|---|---|---|
| 4,434,388 | A * | 2/1984 | Carver et al. | 315/307 |
| 4,527,093 | A * | 7/1985 | Yamauchi et al. | 315/307 |
| 4,649,323 | A * | 3/1987 | Pearlman et al. | 315/307 |
| 8,299,729 | B2 * | 10/2012 | Scenini et al. | 315/307 |
| 2010/0244735 | A1 * | 9/2010 | Buelow, II | 315/294 |
| 2010/0327766 | A1 * | 12/2010 | Recker et al. | 315/291 |
| 2011/0062888 | A1 * | 3/2011 | Bondy et al. | 315/294 |
| 2011/0068689 | A1 | 3/2011 | Scenini et al. | |
| 2011/0291584 | A1 | 12/2011 | Filippo et al. | |

FOREIGN PATENT DOCUMENTS

EP    2230885 A1    9/2009

* cited by examiner

*Primary Examiner* — Crystal L Hammond
(74) *Attorney, Agent, or Firm* — SpryIP, LLC

(57) ABSTRACT

Representative implementations of devices and techniques provide a linear walk arrangement for a control signal. A modified clock signal is used to increment or decrement a value of the control signal toward a target value. The modified clock signal is based on a specified transition time and a difference between an initial value for the control signal and the target value. Multiple control signals may be transitioned such that the control signals arrive at their respective target values simultaneously, notwithstanding the differences in transitions among the control signals.

25 Claims, 7 Drawing Sheets

LINEAR WALK ARRANGEMENT

BACKGROUND

With the proliferation of light-emitting-diode (LED) lamps, as well as other types of lamps, there are many applications which include dimming the lamps and changing the color of the lamps. For example, it is often desirable for LED lamps in residential and commercial applications to be dimmable. Additionally, it may be desirable for LED lamps to have the capability to change colors when used in instrumentation, user interface displays, and other information-related applications. Further, display screens for information or entertainment applications make use of LED lamps that dim and/or change colors.

Changing the color of a lamp instantaneously can be unpleasant to a viewer in some instances. However, changing the color of a lamp in an aesthetically pleasing and smooth manner can be a challenge. Some software solutions have been used that run on microcontrollers, state machines, and the like. For example, a timed interrupt service routine may be employed that varies the intensities of component colors of the lamp in a defined manner. Like many hardware solution counterparts, these software routines may either provide rough rather than smooth color transitions or they can result in unaesthetic transition colors. In some instances, more complex software routines can be used to provide smoother color transitions, but these complex routines generally result in an undesirably high processing load.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

FIG. 4 also includes a line graph showing an example linear walk result using the pseudo-fractional divider arrangement.

DETAILED DESCRIPTION

Overview

Figure 1:
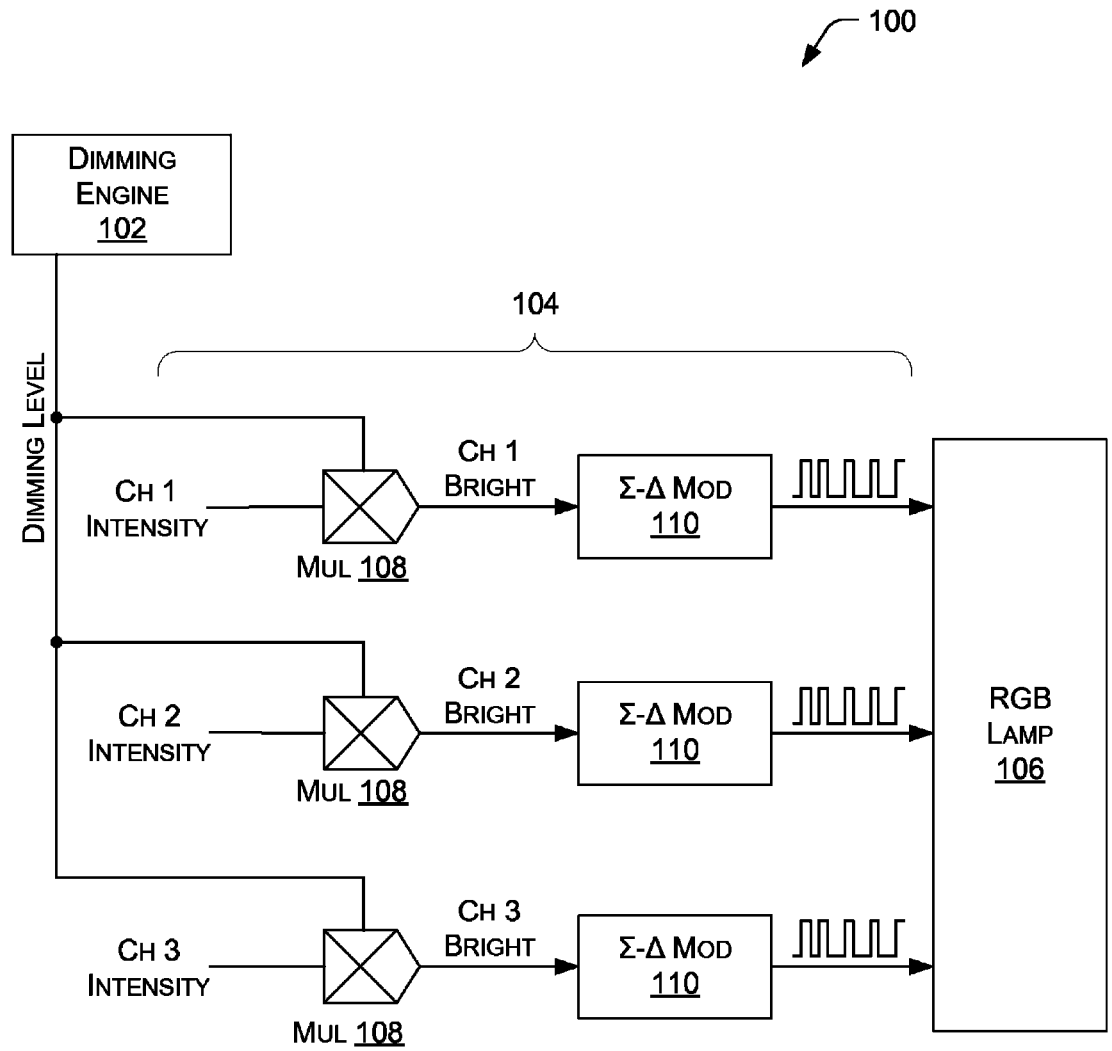
FIG. 1 is a block diagram of an example multi-channel brightness/color control arrangement for a lamp, in which the techniques described herein may be employed, according to an implementation.

When varying the intensity of a lamp, or changing the color of the lamp, it is often desirable to do so in an aesthetically pleasing and smooth manner. In other words, it is desirable to continuously change the intensity or color of the lamp rather than make the change abruptly. This generally includes controlling the time it takes for the lamp to transition in intensity or to change from one color to another.

Representative implementations of devices and techniques provide a linear walk arrangement for a control signal. The control signal may be used to vary the intensity of a lamp, change the color of the lamp, and the like. For example, multiple control signals may be used to vary the intensity of multiple color components of a lamp concurrently, thereby changing the overall color of the lamp. The linear walk arrangement linearly varies the control signal(s) so that the color and/or brightness changes of the lamp are smooth transitions.

A modified clock signal is used to increment or decrement (i.e., transition) a value of the control signal(s) from an initial value toward a target value. The modified clock signal is based on a specified transition time and a difference between the initial value and the target value for the control signal, for each transition. Multiple control signals may be transitioned such that the control signals arrive at their respective target values simultaneously, notwithstanding the differences in the transitions among the control signals. For example, several color components of a lamp may be transitioned from an initial state (representing a first color of the lamp) to a target state (representing a second color of the lamp), such that each color component reaches its target state simultaneously, even if one or more of the color components have greater transitions to make than others of the color components, to realize the second color of the lamp.

In some implementations, a pseudo-fractional divider (PFD) is used to modify the clock signal for a control signal transition. Accordingly, multiple PFDs may be used with multiple control signals, each control signal channel including a PFD. In an implementation, the PFD(s) modify the frequency of the clock signal to provide the modified clock signal.

Various implementations and techniques for a linear walk arrangement are discussed in this disclosure. Techniques and devices are discussed with reference to example light-emitting-diode (LED) lamps, devices, and systems. However, this is not intended to be limiting, and is for ease of discussion and illustrative convenience. The techniques and devices discussed may be applied to any of various lamp device designs, types, and the like (e.g., liquid-crystal-display (LCD), polyvinyl-alcohol (PVA) display, piezoelectric material display, electron-stimulated lamps, incandescent lamps, electroluminescent (EL) lamps, etc.), as well as other continuously variable control systems that utilize one or more control signals, and remain within the scope of the disclosure.

Implementations are explained in more detail below using a plurality of examples. Although various implementations and examples are discussed here and below, further implementations and examples may be possible by combining the features and elements of individual implementations and examples.

Example Brightness Control Arrangement

FIG. 1 is a block diagram of an example multi-channel brightness/color control arrangement 100, in which the techniques described herein may be employed, according to an implementation. For example, the multi-channel brightness/color control arrangement 100 may be arranged to vary the brightness of a lamp, change the color of the lamp, and the like.

As illustrated in FIG. 1, an example multi-channel brightness/color control arrangement 100 may include one or more dimming engines 102, a quantity of channels 104, and a lamp 106, for example. In alternate implementations, fewer, additional, or alternative components may be included.

If included, a dimming engine 102 receives a dimming level value from a user for example, and distributes the dimming level value to each of the channels 104. In alternate implementations, the dimming level may be received from another source, such as from an output of a process, or the like. In some implementations, the dimming level is a binary value, an integer, or other similar value. The dimming level value determines the overall brightness of the lamp.

If included, each of the channels 104 may include a multiplier 108 and a modulator 110. The multiplier 108 is arranged to receive the dimming level value from the dimming engine 102 and an intensity value (e.g., ch 1 intensity, ch 2 intensity, ch 3 intensity) for each channel 104, and combine them (e.g., multiply the dimming and intensity values) to form a brightness value (e.g., ch 1 bright, ch 2 bright, ch 3 bright). In an implementation, the intensity value is a binary value, an integer, or the like. For example, in one implementation, the multiplier 108 multiplies the dimming level value by the intensity value, where both are binary values, and retains a quantity of the most significant bits of the product as the output. In one implementation, the intensity value is user-selected.

In an implementation, the relative intensity values of each channel 104 determine the color of the lamp 106. For example, each of the channels 104 may represent a color (i.e., red, green, and blue for a three-color/channel lamp). A combination of a greater intensity on one or more of the channels 104 and a lesser intensity on remaining channels 104 results in a particular overall color of the lamp. Subsequently changing the intensity value of one or more of the channels 104 changes the color of the lamp.

In an implementation, the modulator 110 converts the brightness value to a high frequency bit stream. The bit streams from the channels 104 are the input signals to the lamp 106. In an implementation, the mean value of a bit stream corresponds to the brightness value at the input of the respective modulator 110. For the purposes of this disclosure, a bit stream may be described as a digital approximation of an analog input. For example, a bit stream may include a digital representation that is proportional to the magnitude of the voltage or current of the analog input, over a selected duration. The digital representation may be expressed in various ways (e.g., base 2 binary code, binary coded decimal, voltage values, electrical or light pulse attributes, and the like).

In one implementation, the modulator 110 is a sigma-delta modulator. Sigma-delta modulated currents from the multiplier 108 result in a sigma-delta modulated brightness level at the lamp 106. Since the human eye has a limited bandwidth, it low-pass filters the varying brightness level output by the sigma-delta modulator. If the bit rate is sufficiently high, the eye senses the mean brightness of the lamp 106 that is dependent on the signal output from the sigma-delta modulator. In alternate implementations, other techniques and/or devices may be used to convert the brightness value output at the multiplier 108 to an input signal for the lamp 106. Further, in alternate implementations, the channels 104 may include alternate or additional components to control the brightness and/or color of the lamp 106.

In various implementations, the modulator 110 may be bypassed when a brightness value is output from the multiplier 108 that represents nearly 0% or nearly 100% of the lamp 106 capacity or control signal level. In that case, a corresponding brightness value signal may be fed to the lamp 106 directly. For example, if the desire is for the lamp 106 to be off (e.g., a control signal value near 0%), there is no need for a modulated signal to be sent to the lamp 106. Rather, an off signal (or the lack of any brightness signal) may be sufficient to turn the lamp off. Conversely, if the desire is for the lamp to be at or near 100%, there is no need for a modulated signal to be sent to the lamp 106 then either. Rather, a signal representing full capacity may be sent directly to the lamp 106, bypassing the modulator 110.

In alternate implementations, various dimming and/or brightness levels may be assigned to be treated as nearly 0% (e.g., 0-3%) and nearly 100% (e.g., 97-100%) for the purposes of bypassing the modulator 110. In other implementations, other values and/or ranges may be used, corresponding to the application.

As discussed above, the lamp 106 may be an LED lamp, another type of lamp, or another controlled system that uses variable control signals. In one implementation, changes to the dimming level value and/or to the intensity value at one or more of the channels 104 changes the brightness and/or color of the lamp 106.

In alternate implementations, a multi-channel brightness/color control arrangement 100 may include fewer, additional, or alternate components.

Figure 2:
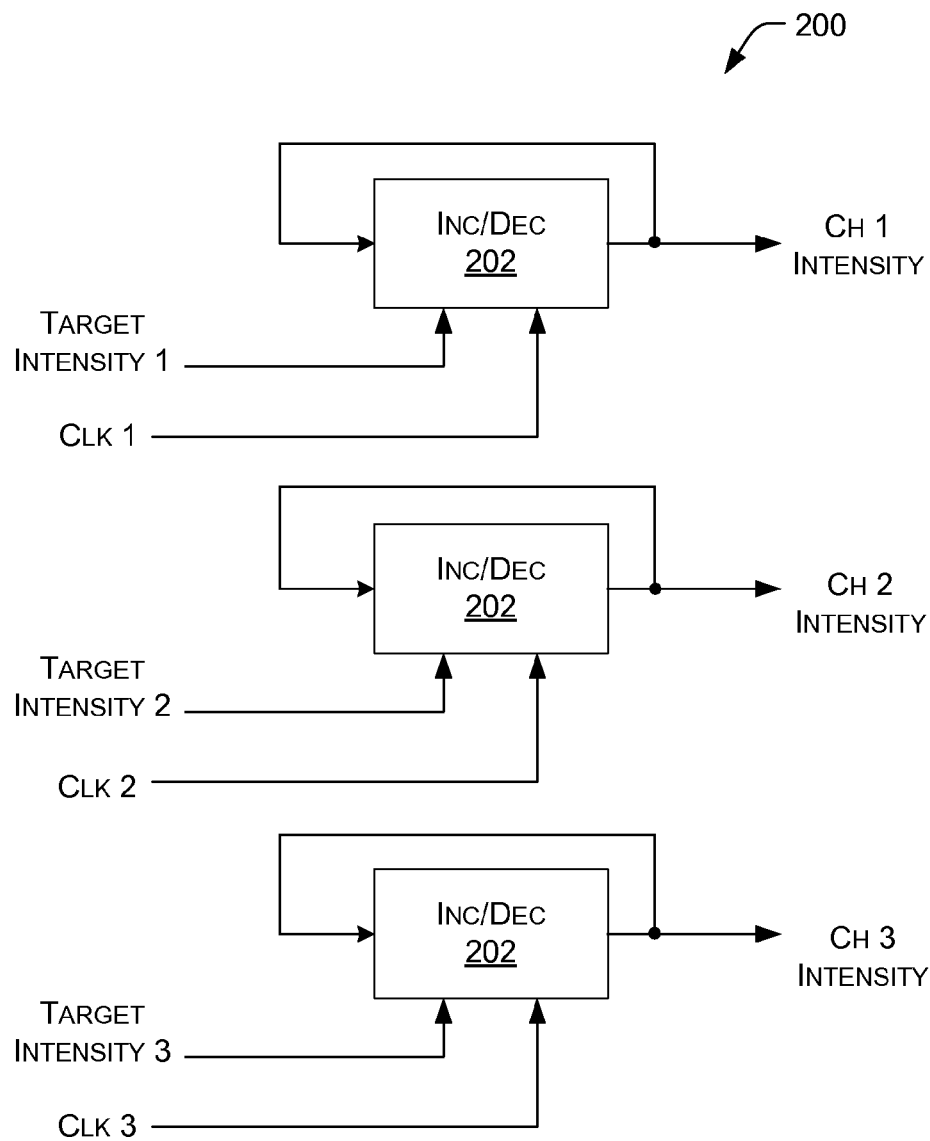
FIG. 2 is a block diagram of an example multi-channel intensity control arrangement for a lamp, which may be employed with the multi-channel brightness/color control arrangement of FIG. 1, for example, according to an implementation.

FIG. 2 is a block diagram of an example multi-channel intensity control arrangement 200 for a lamp 106, which may be employed with the multi-channel brightness/color control arrangement 100 of FIG. 1, for example, according to an implementation. In one implementation, the example multi-channel intensity control arrangement 200 provides the "intensity" values for the channels 104 of the multi-channel brightness/color control arrangement 100, as shown in FIG. 1. For example, the multi-channel intensity control arrangement 200 may provide the intensity values to the channels 104 dynamically as the intensity values change or as target intensities change.

In an implementation, as illustrated in FIG. 2, an example multi-channel intensity control arrangement 200 may include an increment/decrement (I/D) component 202 at each of the channels 104. The I/D component 202 may receive a clock signal (e.g., clk 1, clk 2, clk 3) and a target intensity value (e.g., target intensity 1, target intensity 2, target intensity 3) and output the intensity values for the channels 104, based on these inputs. In one example, the I/D component 202 increments or decrements the intensity value, at the rate of the clock signal, from an initial value until reaching the target intensity value. If the target intensity value then changes, the old (i.e., previous) target intensity becomes the new initial intensity value, and the I/D component 202 increments or decrements the new initial intensity value, at the clock rate, toward the new target intensity.

In various implementations, the target intensities for the channels 104 are user-selected. In one implementation, each of the channels 104 has a unique, individual target intensity. For example, a color may be selected for the lamp 106 (by a user or otherwise), and multiple target intensities may therefore be selected, one for each channel 104, to realize the selected color for the lamp 106. In another example, the target intensities may be individually selected at the start of each transition cycle, where a transition cycle includes incrementing or decrementing an intensity value from an initial value to a target value.

In an implementation, the I/D component 202 may be realized using digital logic components such as counters, and the like. For example, as shown in FIG. 2, with each clock input, the I/D component 202 may increment or decrement an intensity value (depending on the direction needed to reach the target value), with the incremented or decremented value fed back to the input of the I/D component 202 becoming the next value to be incremented or decremented, until reaching the target intensity value.

In alternate implementations, a multi-channel intensity control arrangement 200 may include fewer, additional, or alternate components.

Example Linear Walk Arrangement

Figure 3:
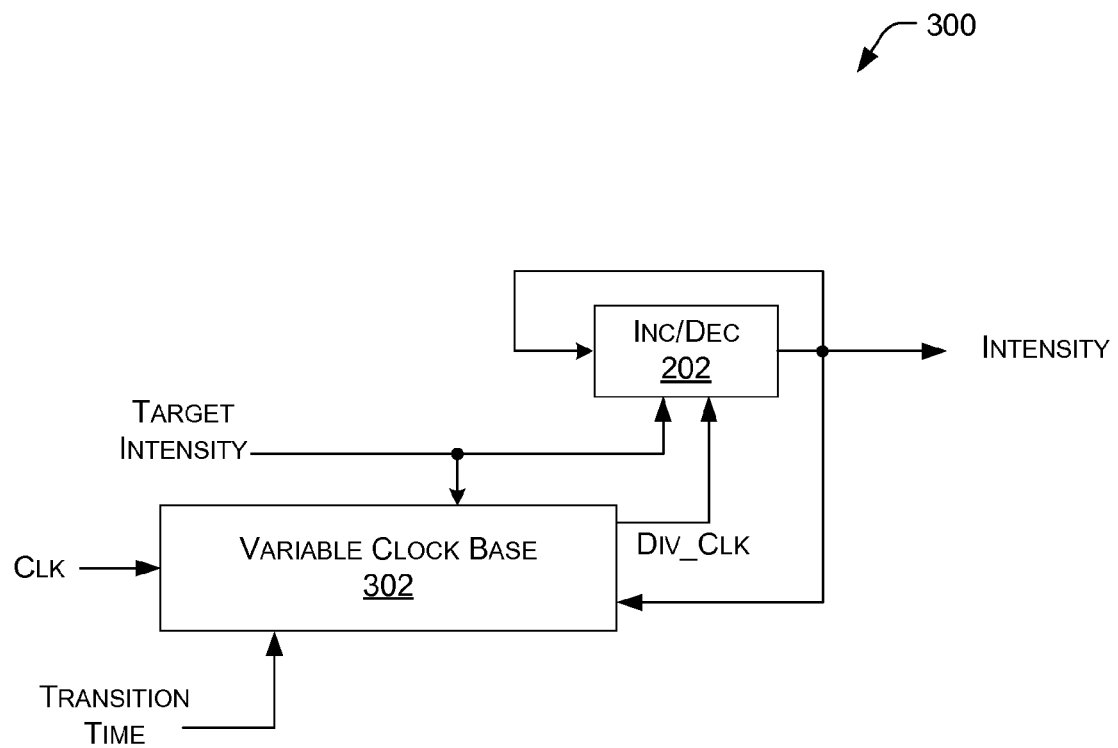
FIG. 3 is a block diagram of a single channel of an example linear walk arrangement, which may be employed in place of the intensity control arrangement of FIG. 2, for example, according to an implementation.

FIG. 3 is a block diagram of an example linear walk arrangement 300, which may be employed in place of the intensity control arrangement 200 of FIG. 2, for example. According to one implementation, the linear walk arrangement 300 is arranged to control a rate of change of the color and/or the brightness of a lamp 106, by supplying the "intensity" value, as shown in FIG. 1. The linear walk arrangement 300 illustrated in FIG. 3 is shown as a single channel 104 arrangement. In various implementations, multiple linear walk arrangements 300 may be used to provide intensity values for multiple channels 104 of a multi-channel brightness/color control arrangement 100, for example.

In an implementation, the linear walk arrangement 300 is a hardware device arranged to provide the intensity values for a channel 104 of the multi-channel brightness/color control arrangement 100. For example, the linear walk arrangement 300 may dynamically provide the intensity values to the channel 104 as the intensities change or as target intensities change. In an implementation, the linear walk arrangement 300 provides a linear progression of intensity values during a transition from an initial intensity value to a target intensity value.

In one implementation, the linear walk arrangement 300 incorporates the I/D component 202 of one channel of the multi-channel intensity control arrangement 200, and provides the input for the channel 104. In the implementation, the I/D component 202 operates as described above, with reference to the intensity control arrangement 200. However, the I/D component 202 of the linear walk arrangement 300 is fed a modified clock signal (div_clk) instead of the base clock signal clk. For example, the I/D component 202 of the linear walk arrangement 300 comprises an increment/decrement portion arranged to receive a modified clock signal div_clk and to linearly increment or decrement an intensity value toward a target intensity value, based on the modified clock signal div_clk. Accordingly, the output of the linear walk arrangement, through the I/D component 202, is a linear succession of intensity values, spanning from an initial value to a target value (i.e., target intensity).

In an implementation, as shown in FIG. 3, the linear walk arrangement also includes a variable clock base 302. In an example, the variable clock base 302 comprises a divider portion arranged to receive a clock signal (clk) and a transition time value and to modify the clock signal clk based on the transition time value to produce the modified clock signal (div_clk). In one implementation, the transition time value represents a time for the intensity value to transition from an initial intensity value to the target intensity value. In an implementation, the target intensity value and/or the transition time value are user-selectable or user-configurable.

In one implementation, as illustrated in FIG. 3, the linear walk arrangement 300 includes a feedback loop as described above with respect to the I/D component 202. The feedback loop for the linear walk arrangement 300 operates in like manner as described, feeding an incremented or decremented intensity value back to the input of the I/D component 202 (i.e., increment/decrement portion) and may also feed the incremented or decremented intensity value back to the input of the variable clock base 302 (i.e., the divider portion) as well.

In an implementation, the variable clock base 302 comprises a fractional frequency divider, or pseudo-fractional divider (PFD) 400. An example PFD 400 is illustrated in the top portion of FIG. 4. In alternate implementations, the variable clock base 302 may comprise a fractional divider, phase-locked loop (PLL), or any other device or system arranged to modify the clock signal clk to form the modified clock signal div_clk.

Figure 4:
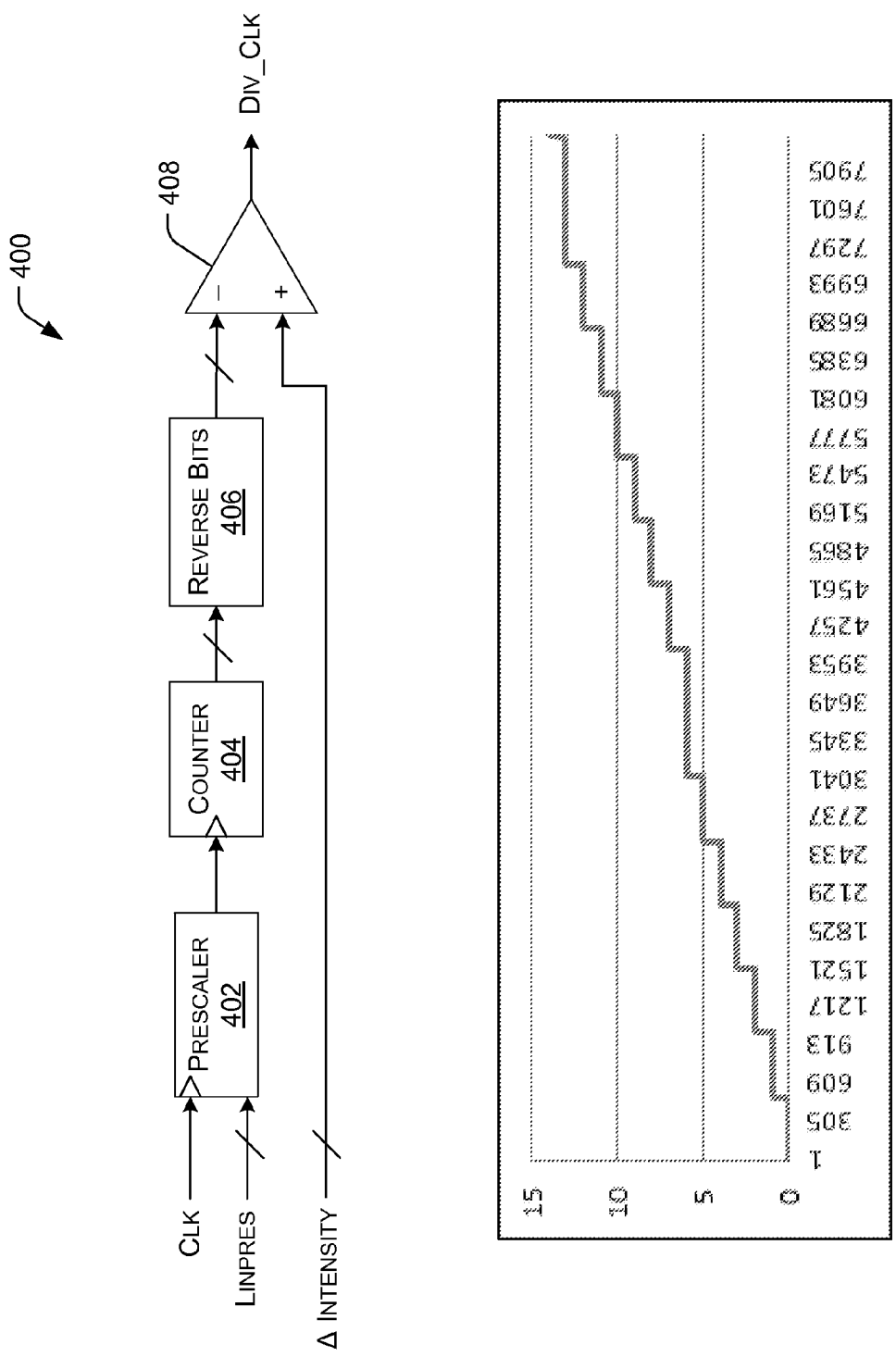
FIG. 4 is a block diagram of an example pseudo-fractional divider arrangement, which may be employed with the linear walk arrangement of FIG. 3, for example, according to an implementation.

Referring to FIG. 4, an example PFD 400 may include a prescaler 402, a counter 404, a reverse bit device 406, and a comparator 408. In an implementation, one or more of the components of the PFD 400 may be combined (e.g., a reverse-bit counter may be used) or fewer, additional, or alternate components may be used. In an implementation the PFD 400 is arranged to modify the clock signal clk to form the modified clock signal div_clk based on a comparison of a reverse ordered count and a difference ($\Delta$ Intensity) between the initial intensity value and the target intensity value.

In an implementation, the variable clock base 302 (i.e., divider portion) is arranged to modify a frequency of the clock signal clk to produce the modified clock signal clk_div, where the frequency is based on the time for the intensity value to transition from the initial intensity value to the target intensity value and a difference between the initial intensity value and the target intensity value. For example, referring to FIG. 4, an example PFD 400 may include the following operation: The prescaler 402 receives the base clock signal clk and a numerical linear prescaler signal LINPRES, which is based on the transition time input (see FIG. 3) and represents the time selected for the transition from the initial intensity value to the target intensity value. In an implementation, the value of LINPRES is a divider or scaler for the base clock clk. In another implementation, the number of bits supported by the prescaler 402 determines the time bandwidth for the transitions. For example, the greater the number of bits of the prescaler 402, the greater the transition time that may be selected.

The prescaled clock signals are output from the prescaler 402 and counted by the counter 404. The reverse bit device 406 transposes the bits of the counter 404, reversing their order such that the least-significant bit (LSB) of the counter 404 becomes the most-significant bit (MSB), and so on. The reversed-bit count is compared to the numerical difference ($\Delta$ Intensity) between the initial intensity value and the target intensity value at the comparator 408. In one implementation, the difference value $\Delta$ Intensity is calculated at the start of the intensity value transition, and is stable during the transition. The output of the comparator 408 is a distribution of high and low values, based on the comparison, which is the modified clock signal div_clk. This modified clock signal is a pseudo-fractional form of the base clock clk, at a variable frequency.

The graph at the lower portion of FIG. 4 represents an example "imperfect straight line" linear result of an example linear walk arrangement 300, while using the PFD 400. The graph shows intensity values over clock cycles, during the transition time. In the example graph, the transition from the initial intensity value ("0") to the target intensity value ("14") is shown on the vertical axis. In this example, Δ Intensity is equal to the numerical value 14. The base clock (clk) cycles are shown on the horizontal axis. The graph illustrates the quantization effect of the reverse-bit counter in forming the linear transition from the initial intensity value to the target intensity value.

As seen in the graph of FIG. 4, a varying number of clock (clk) counts (horizontal axis) may be equal to a single intensity increment count (vertical axis). Because of this, the overall shape of the graph is substantially linear as it transitions from the initial intensity value to the target intensity value.

In various implementations, some or all components of the linear walk arrangement 300 may be implemented using one or more logic devices or components. For example, some or all of the components of the I/D component 202 and/or the variable clock base 302 (including a PFD 400) may be implemented as separate or integrated digital logic devices.

As discussed above, the techniques, components, and devices described herein with respect to the linear walk arrangement 300 are not limited to the illustrations in FIGS. 3 and 4, and may be applied to other devices and designs without departing from the scope of the disclosure. In some cases, additional or alternative components may be used to implement the techniques described herein. Further, the components may be arranged and/or combined in various combinations, while resulting in the linear transition intensity output. It is to be understood that a linear walker arrangement 300 may be implemented as a stand-alone device or as part of another system (e.g., integrated with other components, systems, etc.).

Example Implementations

As discussed previously, multiple linear walk arrangements 300 may be used to provide intensity values and therefore brightness and/or color control to multiple channels 104 of a lamp 106 (or other control system having multiple control signals). For example, a lamp 106 having three color components RGB (e.g., red, green, and blue) may be described in terms of a three-dimensional coordinate system, where the intensity of each of the color components is represented on an axis of the coordinate system (e.g., red-intensity, green-intensity, and blue-intensity). Each color that the lamp 106 can realize may be described as a triplet of three points, with each point being an intensity value on one of the three axes. In alternate implementations, fewer or more intensity values/points may also be used to describe a lamp 106 or other system having fewer or more than three colors or control components.

For a lamp 106 to have a smooth color change from one color to another, it is desirable that the intensities of each of the color components reach their target intensities at the same time. In other words, the transition of each channel 104 control signal (e.g., intensity value) takes the same amount of time, irrespective of the differences in the transitions among the control signals. In various implementations, the transition time for the color components is user-selectable/configurable.

In an implementation, the intensity values of the different channel control signals change with different speeds (i.e., different rates of change) to ensure that they each arrive at their target value at substantially the same time. In one example, each of the linear walk arrangements 300 includes a different modified clock rate div_clk, having a different frequency. For instance, during color transitions on the channels 104, the intensity values are changed along substantially straight lines with different slopes, but with substantially equal lengths of time. For example, in a RGB coordinate system, if the initial color intensity values are (4095, 3095, 2095) and the target values are (1095, 4095, 95), then the intensity differences are (3000, 1000, −2000). If the desired (i.e., selected) transition time is 1 second, then the rates of change are substantially (3000/s, 1000/s, −2000/s), i.e. the red channel value changes 3 times as fast as the green channel value and the blue channel value changes twice as fast as the green channel value. This may be achieved by incrementing/decrementing the respective channel 104 intensities with differently prescaled clocks. In this example, the prescaled clock frequencies are (3000/s, 1000/s, −2000/s).

In an implementation, each channel 104 is controlled independently. The prescaled clock frequency for a channel 104 can be calculated by: $f_{div\_clk} = \Delta$ Intensity/(transition time).

Figure 5:
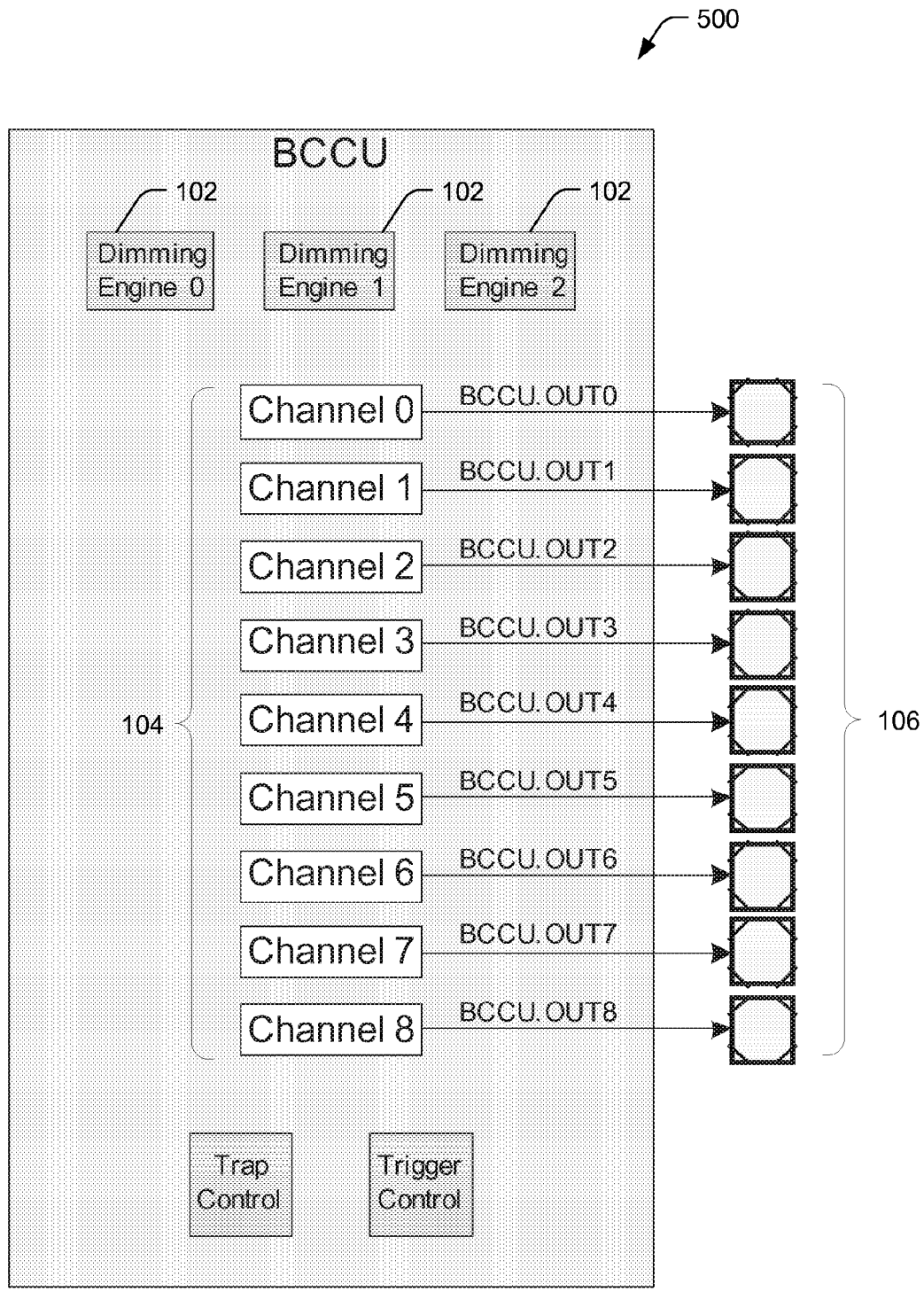
FIG. 5 is a block diagram of an example integrated brightness and color control unit (BCCU), which may incorporate a linear walk arrangement, according to an implementation.
Figure 6:
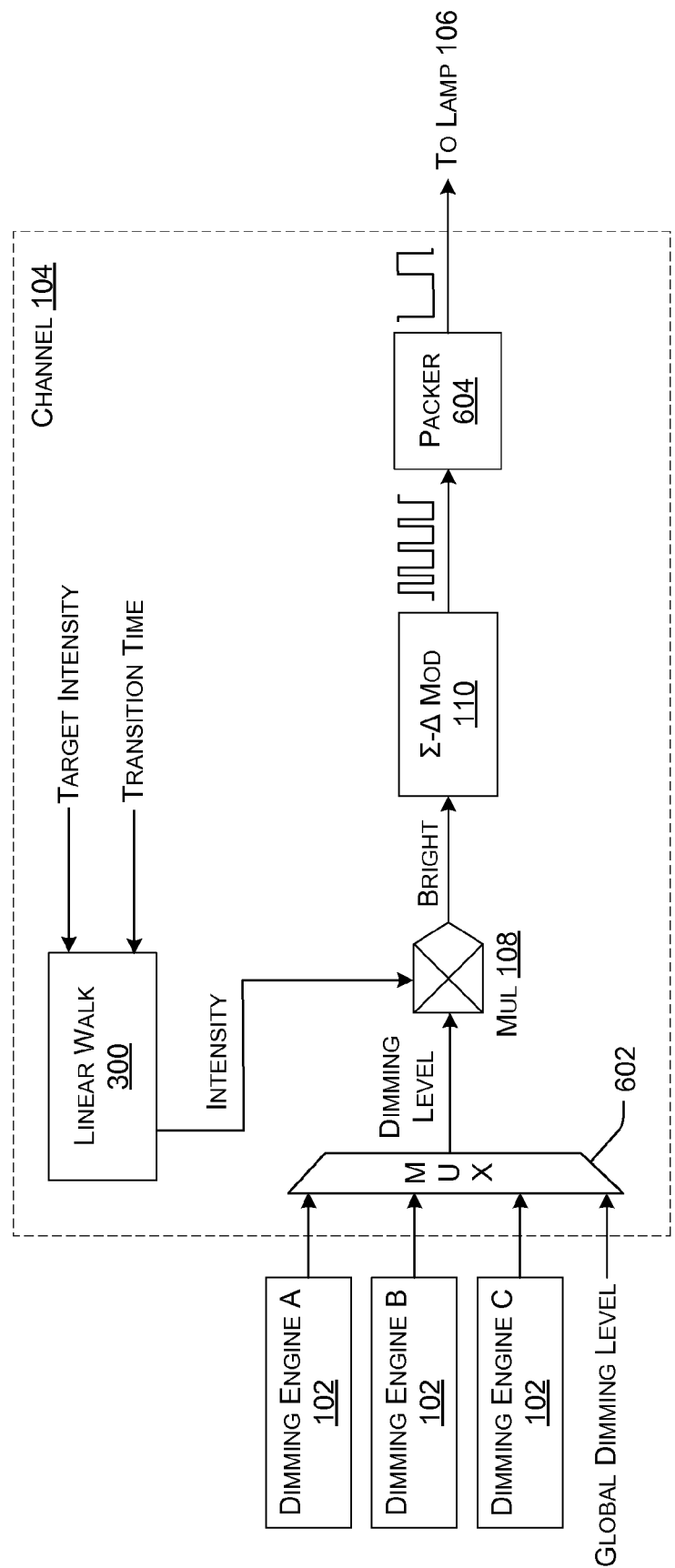
FIG. 6 is a block diagram showing example components of a channel, which may be employed as part of the BCCU of FIG. 5, for example, according to an implementation.

FIG. 5 shows a block diagram of an example brightness and color control unit (BCCU) 500, which may incorporate multiple linear walk arrangements 300, according to an implementation. In various implementations, the components of a linear walk arrangement 300 may be distributed. In the example shown in FIG. 5, the BCCU 500 includes at least 9 channels 104. In an example, each of the 9 channels 104 may include a linear walk arrangement 300 (as shown in FIG. 6) as part of a multi-channel brightness/color control arrangement 100. Additionally, some or each of the 9 channels 104 may be used to control the color and/or brightness of a lamp 106 or another type of control system using multiple control signals.

In an example hardware implementation, such as the BCCU 500, a system of multiple linear walk arrangements 300 includes at least a first linear walk device 300 arranged to linearly increment or decrement a first channel control signal value from a first initial value to a first target value at a first rate of change and a second linear walk device 300 arranged to linearly increment or decrement a second channel control signal value from a second initial value to a second target value at a second rate of change. For example, the first channel control signal value may be arranged to control an intensity of a first color component of a lamp 106 and the second channel control signal value may be arranged to control an intensity of a second color component of the lamp 106. Although first and second channel control signals are referenced explicitly herein, such signals are merely exemplary. In particular, multiple linear walk devices may each increment or decrement a channel control signal value thereby a general plurality of channel control signal values may be used.

In an implementation, the first and second channel control signal values are incremented by the first and second linear walk devices 300 such that the first channel control signal value arrives at the first target value and the second channel control signal value arrives at the second target value substantially simultaneously. For example, the first and second channel control signal values may arrive at their respective target values at a user-selected or user-configurable target time.

In one implementation, as described with reference to FIGS. 2-4, the system includes a first clock component (e.g., variable clock base 302) operating the first linear walk device 300 at a first frequency and a second clock component (e.g., variable clock base 302) operating the second linear walk device 300 at a second, different frequency. In the implementation, the first frequency is based on a difference between the first initial value and the first target value and the second frequency is based on a difference between the second initial value and the second target value. In one example, the first rate of change and the second rate of change are unequal, as described above. Alternately, one or more channel signal values may have substantially equal rates of change during a transition.

In various hardware implementations, such as with a BCCU 500 for example, a system may include a plurality of additional linear walk devices 300, each of the plurality of additional linear walk devices arranged to increment or decrement respective additional control signal values from respective initial values to respective target values, such that each of the respective additional control signal values arrives at its respective target value substantially simultaneously with the first channel control signal value arrival at the first target value and the second channel control signal value arrival at the second target value.

In such an implementation, each of the linear walk devices 300 (including the first, second and additional linear walk devices 300) may include the increment/decrement component 202 and the variable clock base 302 (e.g., divider component), as discussed above. Further, each of the variable clock bases 302 may include a pseudo-fractional divider 400, a bit-reverse counter, a comparator, or the like.

FIG. 6 is a block diagram showing example components of a channel 104, which may be employed as part of the BCCU 500 of FIG. 5, for example, according to an implementation. The example channel 104 may include some or all of the components discussed with respect to the example multi-channel brightness/color control arrangement 100. In alternate implementations, the channel 104 may include additional or alternate components.

As illustrated in FIG. 6, an example channel 104 may include multiple dimming engines 102 that may be multiplexed (at MUX 602) to form a single dimming level, for example. In an implementation, the MUX 602 may select the output of one dimming engine 102 as the input signal of the channel 104. In various implementations, the MUX 602 may alternate selection of the dimming engine 102 outputs, for example. Additionally, a global dimming level may also be multiplexed with individual dimming outputs from the dimming engines 102. The resulting dimming level output from the MUX 602 is combined with the intensity value, as discussed above.

As shown in FIG. 6, and discussed above, the output of the modulator 110 is a high frequency bit stream. In some implementations, a bit packer 604 is arranged to receive the bit stream, and convert it to a signal that is more easily used by the lamp 106, or the like. For example, the bit packer 604 may convert the high frequency bit stream to another digital form with a lower rate of change.

In alternate implementations, such as the implementation of FIG. 6, various channel 104 configurations may be employed to provide brightness and/or color control to the lamp 106, or the like. In each of these channel 104 configurations, a linear walk arrangement 300 can be used to supply the intensity value, as described above.

In various implementations, additional or alternative components may be used to accomplish the disclosed techniques and arrangements.

Representative Process

Figure 7:
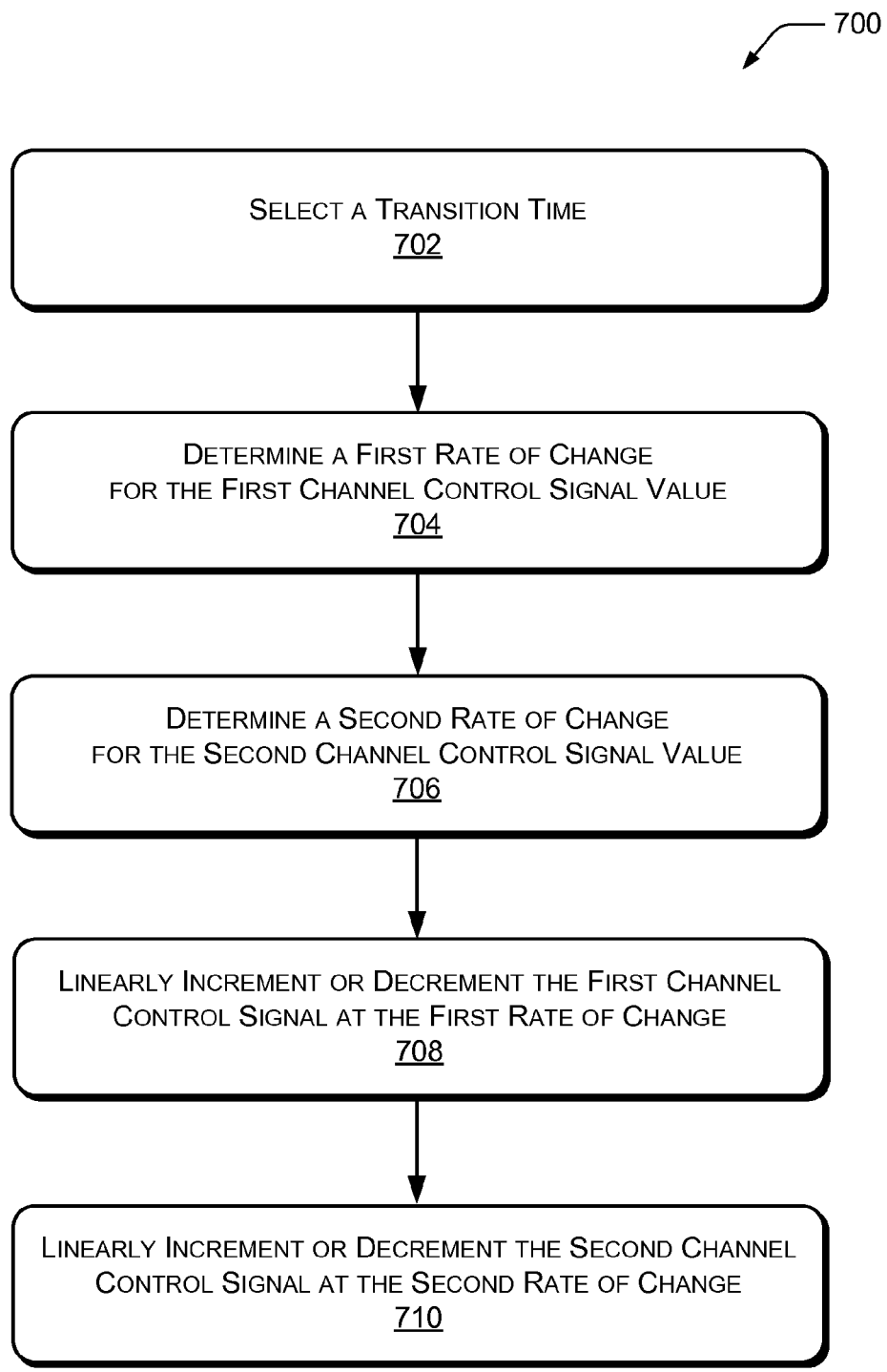
FIG. 7 is a flow diagram illustrating an example process for providing a linear walk of a color intensity change, according to an implementation.

FIG. 7 is a flow diagram illustrating an example process 700 for providing a linear transition for a control signal value, such as for a color component of a lamp (e.g., lamp 106), according to an implementation. The process 700 describes linearly incrementing or decrementing a control signal value according to a determined or preselected rate of change. A linear walk arrangement (such as linear walk arrangement 300) may be used to provide the linear transitions. In one example, multiple control signals are transitioned by multiple linear walk arrangements such that each control signal value reaches its target value substantially simultaneously. The process 700 is described with reference to FIGS. 1-6.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 702, the process includes selecting a transition time for a lamp (such as lamp 106) to transition from a first color to a second color. In an implementation, the transition time is user-selectable or user-configurable.

At block 704, the process includes determining a first rate of change for a first channel control signal value to transition from a first initial value to a first target value. In an implementation, the first rate of change is based on the transition time and a difference between the first initial value and the first target value.

At block 706, the process includes determining a second rate of change for a second channel control signal value to transition from a second initial value to a second target value. In an implementation, the second rate of change is based on the transition time and a difference between the second initial value and the second target value.

At block 708, the process includes linearly incrementing or decrementing the first channel control signal value at the first rate of change toward the first target value. At block 710, the process includes linearly incrementing or decrementing the second channel control signal value at the second rate of change toward the second target value. In an implementation, the first and second channel control signal values are incremented or decremented such that the first channel control signal value arrives at the first target value and the second channel control signal value arrives at the second target value substantially simultaneously.

In an implementation, the process includes modifying a frequency of a clock signal to form a first modified clock signal based on the transition time and the difference between the first initial value and the first target value. In the implementation the process includes modifying a frequency of a clock signal to form a second modified clock signal based on the transition time and the difference between the second initial value and the second target value. In various implementations, the frequency of the first modified clock signal and the frequency of the second modified clock signal are unequal.

In one implementation, the process includes controlling a color of a lamp and/or a brightness of the lamp via the first channel control signal value and the second channel control signal value.

In another implementation, the process includes receiving a subsequent first target value and a subsequent second target value. In such an implementation, the previously used first and second target values become the new first initial value and new second initial value for the new transition. The process then includes determining a subsequent first rate of change for the first channel control signal value to transition from the first target value (i.e., new first initial value) to the subsequent first target value, where the subsequent first rate of change is based on the transition time and a difference between the first target value and the subsequent first target value. The process also includes determining a subsequent second rate of change for the second channel control signal value to transition from the second target value (i.e., new second initial value) to the subsequent second target value, where the subsequent second rate of change is based on the transition time and a difference between the second target value and the subsequent second target value.

In the implementation, the process includes linearly incrementing or decrementing the first channel control signal at the subsequent first rate of change toward the subsequent first target value; and linearly incrementing or decrementing the second channel control signal at the subsequent second rate of change toward the subsequent second target value, such that the first channel control signal value arrives at the subsequent first target value and the second channel control signal value arrives at the subsequent second target value substantially simultaneously.

In alternate implementations, other techniques may be included in the process 700 in various combinations, and remain within the scope of the disclosure.

Conclusion

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. A hardware device, comprising:
   an increment/decrement portion arranged to receive a modified clock signal and to linearly increment or decrement an intensity value toward a target intensity value, based on the modified clock signal; and
   a divider portion arranged to receive a clock signal and a transition time value and to modify the clock signal based on the transition time value to produce the modified clock signal, the transition time value representing a time for the intensity value to transition from an initial intensity value to the target intensity value.

2. The device of claim 1, further comprising a pseudo-fractional divider arranged to modify the clock signal based on a comparison of a reverse ordered count and a difference between the initial intensity value and the target intensity value.

3. The device of claim 2, wherein the pseudo-fractional divider includes at least one of a bit reverse counter, a prescaler, and a comparator.

4. The device of claim 1, further comprising a feedback loop arranged to feed an incremented or decremented intensity value back to the input of the increment/decrement portion and/or the input of the divider portion.

5. The device of claim 1, wherein the divider portion is further arranged to modify the clock signal based on a difference between the initial intensity value and the target intensity value to produce the modified clock signal.

6. The device of claim 1, wherein the divider portion is arranged to modify a frequency of the clock signal to produce the modified clock signal, the frequency based on the time for the intensity value to transition from the initial intensity value to the target intensity value and a difference between the initial intensity value and the target intensity value.

7. The device of claim 1, wherein at least one of the target intensity value and the transition time value are user selectable.

8. The device of claim 1, wherein the device is arranged to control a rate of change of at least one of a color and a brightness of a lamp.

9. A system implemented in hardware, comprising:
   a first linear walk device arranged to linearly increment or decrement a first channel control signal value from a first initial value to a first target value at a first rate of change; and
   a second linear walk device arranged to linearly increment or decrement a second channel control signal value from a second initial value to a second target value at a second rate of change, such that the first channel control signal value arrives at the first target value and the second channel control signal value arrives at the second target value substantially simultaneously.

10. The system of claim 9, further comprising a first clock component operating the first linear walk device at a first frequency and a second clock component operating the second linear walk device at a second, different frequency.

11. The system of claim 10, wherein the first frequency is based on a difference between the first initial value and the first target value and the second frequency is based on a difference between the second initial value and the second target value.

12. The system of claim 9, wherein the first rate of change and the second rate of change are unequal.

13. The system of claim 9, wherein the first channel control signal value is arranged to control an intensity of a first color component of a lamp and the second channel control signal value is arranged to control an intensity of a second color component of the lamp.

14. The system of claim 9, wherein each of the first and second linear walk devices includes an increment/decrement component and a variable clock base.

15. The system of claim 14, wherein each variable clock base of the first and second linear walk devices includes at least one of a pseudo-fractional divider and a bit-reverse counter.

16. The system of claim 9, wherein the first channel control signal value arrives at the first target value and the second channel control signal value arrives at the second target value at a user-selected target time.

17. The system of claim 9, further comprising a plurality of additional linear walk devices, each of the plurality of additional linear walk devices arranged to increment or decrement respective additional control signal values from respective initial values to respective target values, such that each of the respective additional control signal values arrives at its respective target value substantially simultaneously with the first channel control signal value arrival at the first target value and the second channel control signal value arrival at the second target value.

18. The system of claim 17, wherein each of the additional linear walk devices includes:
   an increment/decrement component arranged to receive a modified clock signal and to linearly increment or decrement a respective additional control signal value toward an associated respective target value, based on the modified clock signal; and
   a divider component arranged to receive a clock signal and a transition time value and to modify the clock signal based on the transition time value to produce the modified clock signal, the transition time value representing a target time for the respective additional control signal value to transition from the respective initial value to the associated respective target value.

19. A method, comprising:
   selecting a transition time for a lamp to transition from a first color to a second color;

determining a first rate of change for a first channel control signal value to transition from a first initial value to a first target value, the first rate of change based on the transition time and a difference between the first initial value and the first target value;

determining a second rate of change for a second channel control signal value to transition from a second initial value to a second target value, the second rate of change based on the transition time and a difference between the second initial value and the second target value;

linearly incrementing or decrementing the first channel control signal value at the first rate of change toward the first target value; and linearly incrementing or decrementing the second channel control signal value at the second rate of change toward the second target value, such that the first channel control signal value arrives at the first target value and the second channel control signal value arrives at the second target value substantially simultaneously.

20. The method of claim 19, further comprising modifying a frequency of a clock signal to form a first modified clock signal based on the transition time and the difference between the first initial value and the first target value and a second modified clock signal based on the transition time and the difference between the second initial value and the second target value.

21. The method of claim 19, further comprising controlling at least one of a color and a brightness of the lamp via the first channel control signal value and the second channel control signal value.

22. The method of claim 19, further comprising:

receiving a subsequent first target value and a subsequent second target value;

determining a subsequent first rate of change for the first channel control signal value to transition from the first target value to the subsequent first target value, the subsequent first rate of change based on the transition time and a difference between the first target value and the subsequent first target value;

determining a subsequent second rate of change for the second channel control signal value to transition from the second target value to the subsequent second target value, the subsequent second rate of change based on the transition time and a difference between the second target value and the subsequent second target value;

linearly incrementing or decrementing the first channel control signal value at the subsequent first rate of change toward the subsequent first target value; and linearly incrementing or decrementing the second channel control signal value at the subsequent second rate of change toward the subsequent second target value, such that the first channel control signal value arrives at the subsequent first target value and the second channel control signal value arrives at the subsequent second target value substantially simultaneously.

23. An apparatus, comprising:

one or more logic devices arranged to individually increment or decrement a plurality of control signal values from unique initial values to associated unique target values, such that each of the plurality of control signal values arrive at their respective target values substantially simultaneously, the one or more logic devices arranged to individually increment or decrement the plurality of control signal values at unique rates of change based on differences between each respective initial value and its associated target value.

24. The apparatus of claim 23, wherein the plurality of control signal values are arranged to control at least one of a color intensity and a brightness of a lamp.

25. The apparatus of claim 23, wherein the one or more logic devices include at least one of a prescaler, a counter, a bit reversing device, and a comparator.

\* \* \* \* \*